Patented July 10, 1951

UNITED STATES PATENT OFFICE 2,559,671

AZO COMPOUNDS OF THE THIOPHANTHRAQUINONE SERIES

Herman E. Schroeder and Lorraine A. Ringrose, Wilmington, Del., assignors to E. I. du Pont de Nemours & Company, Wilmington, Del., a corporation of Delaware No Drawing. Application June 17, 1949,
Serial No. 99,875

4 Claims. (Cl. 260—152)

This invention relates to vat dyestuffs and intermediates of the thiophanthraquinone series, and more particularly to simple derivatives of the monocarboxylic acids resulting from the ring closure of mono-(ortho-halogen-thiophanthraquinonyl-amides of azobiphenyldicarboxylic acid.

While a number of vat dyes in the yellow range have been used in the dyeing and printing of textiles, the fastness properties of these yellow colors are poor as compared with the fastness properties of many of the other colors in the vat dye class. Where yellow dyes in this class with improved fastness properties have been found, they in turn are either dull or weak tinctorially and therefore the various yellow dyes in the vat dye class are chosen to answer a particular need, balancing the question of fastness, brightness and cost of the particular dye available.

It is an object of this invention to produce new and valuable mono-azole derivatives of azobiphenylcarbonylaminothiophanthraquinone compounds which are useful vat dyes, pigments and intermediates for the preparation of other dyes. It is a further object of the invention to produce new vat dyes and pigments of attractive yellow shades and outstanding fastness properties, particularly fastness to light.

The compounds of this invention are prepared by the condensation of equal molecular ratios of ortho - halogenaminothiophanthraquinones and azobiphenyldicarboxylic acid halide. The reaction is carried out in an inert organic solvent. When the condensation is completed, water, alcohol, ammonia or a simple amino compound may be added to replace the remaining chlorine of the second acid chloride group on the azobiphenyldicarboxylic acid chloride, and the resulting product is then ring closed to form the unsymmetrical oxazole. Where it is desired that a free acid chloride group be present on the azobiphenyl radical in the final compound, the free acid derivative may be reconverted to the acid chloride in the usual manner after the ring closure of the oxazole ring.

The compounds of this invention have the following general formula:

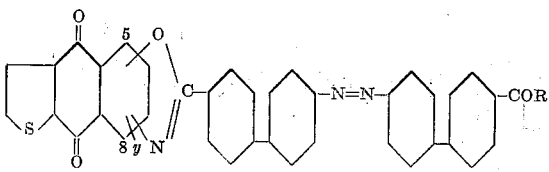

in which the O and N of the oxazole ring are connected in ortho position on the thiophanthraquinone radical and the hetero-oxygen is attached to one of the positions 5 and 8, Y stands for an element of the group consisting of H, Cl and Br attached in position ortho to the nitrogen atom of the azole ring, and R stands for a radical of the group consisting of —OH, —Cl, —O-alkyl, —NH₂, —NH-alkyl and —NH-aryl, in which the O-alkyl group may carry from 1 to 18 carbon atoms, the —NH-alkyl from 1 to 4 carbon atoms and the aryl group is a hydrocarbon radical of the benzene and naphthalene series.

The azobiphenylcarbonylaminothiophanthraquinone compounds may be prepared as hereinafter described or as more particularly disclosed in our co-pending application Serial No. 99,874 filed of even date herewith. The ring closure of the carbonylaminothiophanthraquinone group to the oxazole may be effected as hereinafter described or by the methods more fully disclosed in our co-pending applications Serial No. 99,877 and Serial No. 99,878, filed of even date herewith.

The compounds of this invention, which are of comparatively simple structure, exhibit good tinctorial strength and fastness properties particularly to light, which is quite unexpected particularly with regard to the free carboxylic acid compound, which ordinarily confers alkali solubility and accordingly poor washing fastness.

The following examples are given to illustrate the invention. The parts used are by weight, unless otherwise specified.

Example 1

Sixty (60) parts of 4,4'-azobiphenyl-4",4"'-dicarboxylic acid (sodium salt) are suspended in 1200 parts of nitrobenzene; 1.5 parts of pyridine and 50 parts of thionyl chloride are added while agitating, and the mass is heated to 95° C. and maintained for 12 hours. It is then air blown for one-half hour (to take out excess thionyl chloride) and cooled to 50° C., when 34 parts of 6-amino-5-chlorothiophanthraquinone are added. The mass is heated to 135° C. and maintained for 6 hours. It is cooled to 120° C., 25 parts of water are added (slowly) and the mass is maintained at 120°–125° C. for 6 hours. It is cooled to 100° C., and 50 parts of sodium carbonate, 50 parts of potassium acetate, 1.5 parts of cupric acetate and 1.5 parts of cuprous chloride are added. The mass is heated to 210° C. and maintained for 6 hours. After cooling, the mass is filtered and the cake washed with nitrobenzene, alcohol and hot water, in turn, and dried. The product is obtained in good yield and quality. It has the following formula:

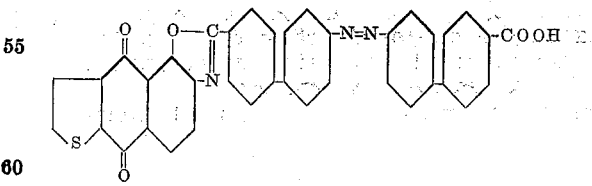

It is a yellow solid, gives an orange-brown sodium hydrosulfite vat and dyes (also prints) cotton in bright yellow shades of very good fastness properties.

Upon treatment of the above product with thionyl chloride or phosphorous pentachloride in an organic solvent such as nitrobenzene, the acid chloride is formed which is represented by the formula:

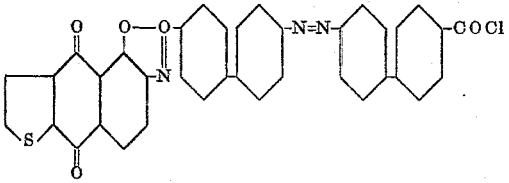

*Example 2*

Forty-five (45) parts of acid chloride as prepared in Example 1, 900 parts of nitrobenzene and 50 parts of lauryl alcohol are heated together at 130° C. for 6 hours. After cooling, the ester so formed is filtered off, washed with nitrobenzene and ethyl alcohol and dried, giving a yield of 41 parts of a yellow solid. This product dyes cotton in yellow shades from an orange-brown sodium hydrosulfite vat, and has the formula:

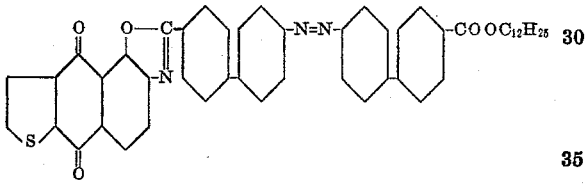

If in the above example other aliphatic alcohols of the series containing from 1 to 18 carbon atoms are substituted for the lauryl alcohol, such as the methyl, ethyl, isopropyl, butyl, octyl, cetyl and octadecyl, or other primary or secondary alcohols containing up to 18 carbon atoms, compounds are obtained which dye cellulose fibers from the usual alkaline hydrosulfite vats in bright yellow shades.

*Example 3*

Eight (8) parts of the acid chloride compound produced in Example 1, and 120 parts of nitrobenzene are heated together to 130° C., and at this temperature a slow stream of ammonia is bubbled through for 4 hours. The mass becomes much redder in color, and after cooling, the amide is filtered off as a reddish-yellow solid, after which it is washed with nitrobenzene, alcohol and hot water. This product dyes cotton from an orange-brown sodium hydrosulfite vat in yellow shades, and has the formula:

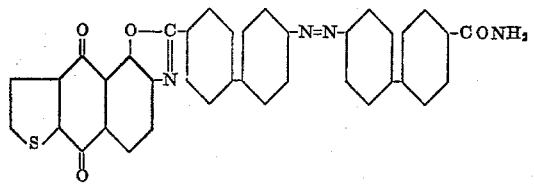

Instead of ammonia in the above example, other amines such as monomethylamine, monoethylamine, isopropylamine, the butylamines, aniline, and alpha- or beta-naphthylamine may be used to give compounds which dye in yellow shades from an alkaline hydrosulfite vat which exhibit excellent fastness properties.

In the same manner, in place of the 6-amino-5-chlorothiophanthraquinone employed in the specific examples to illustrate the present invention, we may use other halogenaminothiophanthraquinones such as the 6-amino-5,7-dibromo(or dichloro)-thiophanthraquinone, the 7-amino-6,8-dibromo(or dichloro)-thiophanthraquinone and the 7-amino-8-chlorothiophanthraquinone, each of which produces yellow vat dyes having similar characteristics to those specifically mentioned in the examples.

In place of nitrobenzene, other high boiling solvents such as nitrotoluenes, di- and trichlorobenzene, naphthalene, alpha-chloronaphthalene, diphenyl ether, etc., can be used as solvents. Phosphorous pentachloride can be employed as acid chloride forming agent instead of thionyl chloride, while as ring closing agents sodium or potassium carbonates, either alone or in conjunction with anhydrous sodium or potassium acetate, formate, etc., can be used in admixture with any desired copper salt or copper oxide.

We claim:

1. The compounds of the general formula:

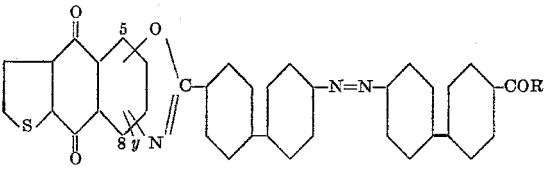

in which the O and N of the oxazole ring are connected in ortho position on the thiophanthraquinone radical and the hetero-oxygen is attached to one of the positions 5 and 8, $y$ stands for a substituent of the group consisting of H, Cl and Br attached in position ortho to the nitrogen atom of the azole ring, and R stands for a substituent of the group consisting of —OH, —Cl, —O-alkyl, —NH$_2$, —NH-alkyl and —NH-aryl, in which the O-alkyl group carries from 1 to 18 carbon atoms, the —NH-alkyl from 1 to 4 carbon atoms and the aryl group is a hydrocarbon radical of the benzene and naphthalene series.

2. The compound of the formula:

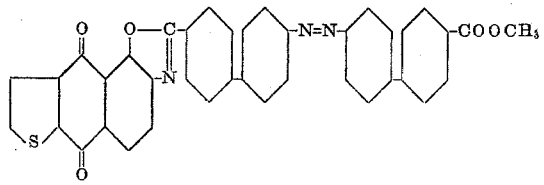

3. The compound of the formula:

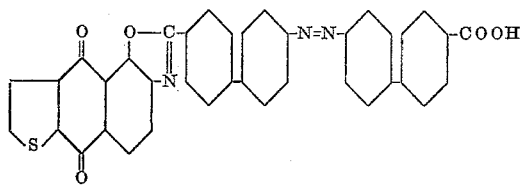

4. The compound of the formula:

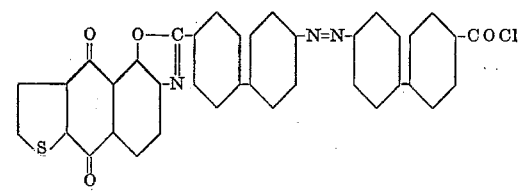

HERMAN E. SCHROEDER.
LORRAINE A. RINGROSE.

No references cited.